United States Patent [19]

Warren et al.

[11] Patent Number: 4,582,575

[45] Date of Patent: Apr. 15, 1986

[54] ELECTRICALLY CONDUCTIVE COMPOSITES AND METHOD OF PREPARATION

[75] Inventors: Leslie F. Warren, Camarillo; Dean S. Klivans, Chatsworth; Louis Maus, Camarillo, all of Calif.

[73] Assignee: Rockwell International Corporation, El Segundo, Calif.

[21] Appl. No.: 646,716

[22] Filed: Sep. 4, 1984

[51] Int. Cl.$^4$ .......................... C25D 1/00; C25D 9/02
[52] U.S. Cl. .......................................... 204/12; 204/3; 204/20; 204/21; 204/22; 204/56 R; 204/59 R; 204/72; 528/423; 548/564
[58] Field of Search .................. 204/3, 12, 56 R, 58.5, 204/59 R, 20, 21, 22, 72, 38.7; 428/265, 268, 319.3, 260, 272, 290, 273, 289, 322.7; 528/423; 548/564

[56] References Cited

U.S. PATENT DOCUMENTS

| | | | |
|---|---|---|---|
| 2,354,110 | 7/1944 | Ford et al. | 428/268 X |
| 2,734,004 | 2/1956 | Robinson | 428/260 |
| 4,214,031 | 7/1980 | Miyakawa et al. | 428/322.7 X |
| 4,401,545 | 8/1983 | Naarmann et al. | 204/291 |
| 4,468,291 | 8/1984 | Naarmann et al. | 204/13 |
| 4,487,667 | 12/1984 | Traynor | 204/59 R |
| 4,488,943 | 12/1984 | Skotheim | 204/58.5 |

FOREIGN PATENT DOCUMENTS 89639  5/1983  Japan ................................... 528/423

OTHER PUBLICATIONS

"Electrochemical Polymerization of Pyrrole on Polymer-Coated Electrodes" by O. Niwa and T. Tamamura, J. Chem. Soc., Chem. Commun., Jul. 1, 1984 issue, pp. 817 and 818.

*Primary Examiner*—G. L. Kaplan
*Attorney, Agent, or Firm*—Charles T. Silberberg; Max Geldin

[57] ABSTRACT

Electrically conductive composites comprising a dielectric porous substance, e.g. fiberglass fabric, and a pyrrole polymer deposited in the pores of such substance. The composites are produced by contacting the porous substance with an anode in an electrolytic cell containing an electrolyte comprising a pyrrole monomer and a substantially non-nucleophilic anion such as bisulfate, and passing an electric current through the cell, thus electrochemically precipitating a conductive pyrrole polymer in the pores of such substance.

35 Claims, No Drawings

ELECTRICALLY CONDUCTIVE COMPOSITES AND METHOD OF PREPARATION

BACKGROUND OF THE INVENTION

The present invention relates to electrically conductive composites, and is particularly concerned with the provision of electrically conductive composites formed of a dielectric porous substance containing a conductive pyrrole polymer in the pores of the substance, and produced by electrochemically precipitating such pyrrole polymer from an electrolyte solution containing a pyrrole monomer and a non-nucleophilic anion, said porous substance being in contact with the anode, the resulting composite having good electrical conductivity and mechanical properties corresponding to those of the initial porous substance.

In the past several years, organic polymers have been discovered which have metallic properties, particularly electrical conductivity up to about 1000 ohm$^{-1}$ cm$^{-1}$. These polymers include doped polyacetylene and polypyrrole.

Although there are many potential applications for conducting polymers, their use has been limited by the fact they are chemically unstable, have poor mechanical properties and/or are difficult to produce in suitable forms.

Polypyrrole which is chemically more stable, for example, than the doped polyacetylene, has the disadvantage of being very brittle. Thin polypyrrole films from about 10 μm to 20 mil thick have been produced on electrodes by electrochemical polymerization. However, these prior art films are too thin and too brittle to be useful in most structurally related applications. Particularly, the brittleness of such conducting polymer films renders their handling for large area applications extremely difficult, if not impossible.

Polypyrrole is produced by electropolymerization as described by A. F. Diaz, et al in an article entitled "Electrochemical Polymerization of Pyrrole" in the *Journal of Chemical Society, Chemical Communications*, 1979, page 635. N-substituted analogs of pyrrole such as N-methylpyrrole and N-phenylpyrrole have been used to form pyrrole polymers as reported by A. F. Diaz, et al in an article entitled "Electrochemistry of Conducting Polypyrrole Films" in the *Journal of Electroanalytical Chemistry*, 129, (1981) pages 115–132. The products produced in these processes are thin (from 20 μm to 30 μm) free-standing films in which anions from the electrolyte, such as tetrafluoborate and perchlorate, are used to dope the polymer and balance the cationic charge of the polymer backbone. However, the resultant polymer film is brittle and does not have the bulk and ductility needed to make the material useful in structural-related applications.

U.S. Pat. No. 4,401,545 to Naarmann, et al, discloses electrically conductive polypyrrole complexes with nitroaromatic anions as dopants, prepared by the anodic oxidation of a pyrrole in a polar solvent, in the presence of a salt of an acidic nitroaromatic compound. However, the thickness of the resulting electrochemically produced polypyrrole complexes is limited and the resulting films are also relatively brittle and hence also have limited structural applicability.

An object of the present invention is to provide a material comprising a conducting polypyrrole, having reduced brittleness and improved structural integrity.

Another object of the invention is to provide an electrically conductive composite formed of a substantially non-conductive or dielectric porous substance and a conductive polypyrrole.

A still further object of the invention is the provision of a process for imparting structural integrity to conductive polypyrrole by impregnating a dielectric porous substance with a pyrrole polymer.

SUMMARY OF THE INVENTION

The above objects are achieved according to the invention by the provision of an electrically conductive composite comprising a dielectric porous substance or substrate, and a pyrrole polymer deposited in the pores of such substance.

The composite is obtained by electrochemical precipitation or deposition of the conducting organic polymer, e.g. polypyrrole and copolymers of pyrrole with N-substituted derivatives thereof, within the pores or interstices of a porous insulating material, such as a porous ceramic, a fabric, e.g. fiberglass, and the like.

In a typical process for producing the composite of the invention, a rotating cylindrical anode is tightly wrapped with a fiberglass fabric and the anode and attached fabric are immersed in an electrolyte containing pyrrole in an aqueous or organic medium containing non-nucleophilic anions, such as bisulfate anions, from sulfuric acid or sodium bisulfate. Such anions function to dope the polymer and balance its cationic charge. Such dopants can also include polymeric materials such as polystyrenesulfonate, which become incorporated into the resulting polymer structure.

After electrolysis, the polymer impregnated insulating material, e.g. fiberglass, is peeled from the anode.

The invention process imparts structural integrity to conducting polymers, particularly polymers of pyrrole. The resulting composite has good electrical conductivity, is essentially non-brittle and can be employed for large area structural applications, such as fastening, bonding and laminating. On the other hand, relatively thick, e.g. greater than 10 mil, unsupported polypyrrole films produced according to the prior art are brittle and difficult to separate from the electrode surface. Thus, thick reinforced composite material can be produced according to the present invention, provided the pores of the supporting insulating material are sufficiently large to permit electrolyte penetration to the electrode surface.

These and other objects and features of the invention will become apparent from the following detailed description of the invention.

DETAILED DESCRIPTION OF THE INVENTION AND PREFERRED EMBODIMENTS

According to the invention, a porous dielectric or electrical insulating material is contacted with an anode in an electrolytic cell containing an electrolyte comprising a pyrrole and a substantially non-nucleophilic anion, in the form of a salt or free acid anion, and a current is passed through the cell under conditions to result in electrochemical precipitation or deposition of a conductive pyrrole polymer in the pores of the porous substance. Such conductive polymer comprises a cationic pyrrole portion and an anionic portion derived from the non-nucleophilic anion from the electrolyte. The anion functions as a dopant to the polymer and renders it electrically conductive.

In carrying out the invention process, porous dielectrics or electrical insulating materials can be used, such as a porous ceramic, a porous glass, e.g. a frit, a porous or reticulated organic foam, e.g. polyurethane, a fabric, which can be woven or non-woven, e.g. fiberglass fabric, a mixed oxide fabric such as an alumina/silica/boria fabric, e.g. Nextel, or a synthetic organic fabric such as Kevlar, a trademark of the DuPont Co. for aromatic polyamide fiber, a polyester such as Dacron cloth, and the like. The insulating material should have pores which are sufficiently large through passages to allow electrolyte penetration through the pores to the electrode surface. The porous insulating material or substrate, e.g. fiberglass cloth, can have a thickness ranging from about 1 to about 10 mils, usually about 2 to about 5 mils.

The electrical insulating material, e.g. fiberglass fabric, is secured to the anode, as by wrapping around same. According to one embodiment, the insulating material is tightly wrapped around a gold plated copper cylindrical anode and tightly secured thereto. The anode containing the insulating material or fiberglass fabric secured thereto, is placed in a vessel containing an electrolyte comprised of an aqueous or organic solution containing pyrrole and/or an N-substituted derivative thereof, and a compound providing non-nucleophilic anions.

Pyrrole, a C-substituted pyrrole, such as a 3- or 3,4-alkyl or aryl substituted pyrrole, e.g. 3-methylpyrrole, 3,4-dimethylpyrrole, 3-phenylpyrrole, or 3-methyl-4-phenylpyrrole, an N-substituted pyrrole, e.g. an N-alkylpyrrole, such as N-methylpyrrole, or an N-arylpyrrole such as N-phenylpyrrole, or a substituted N-phenylpyrrole such as nitrophenylpyrrole, can be employed as monomer to obtain the corresponding conductive pyrrole homopolymer. For production of a conductive copolymer, a mixture of pyrrole and a C- or an N-substituted derivative of pyrrole, as described above, can be employed. The concentration of monomer in the aqueous or solvent solution employed can range from about 0.01 to about 1 molar, a concentration of about 0.1 molar being preferred. It will be understood, however, that concentrations of the pyrrole monomer above or below the above range can be employed in some instances.

A compound or material providing substantially non-nucleophilic anions, is also included in the electrolyte. These are generally strong acid anions such as sulfate, bisulfate, perchlorate, fluoborate, $PF_6^-$, $AsF_6^-$ and $SbF_6^-$ anions. Chloride anion also can be used, even though it is somewhat nucleophilic.

Examples of compounds providing such anions are the free acids and the soluble salts of such acids, e.g. the alkali metal salts. Examples of such compounds include sulfuric acid, sodium sulfate, sodium bisulfate, sodium perchlorate, ammonium fluoborate, hydrogen hexafluoroarsenate, and the like. In addition, the anion can be a sulfonate salt or sulfonic acid anion derived from an organic sulfonate or an organic sulfonic acid, e.g. as provided by p-toluenesulfonate and polymeric sulfonates, e.g. polystyrenesulfonate and polyvinylsulfonate, and trifluoromethylsulfonate, $CF_3SO_3^-$. Also organic sulfate anion such as dodecylsulfate can be employed. The concentration of non-nucleophilic anion or anion producing material can range from about 0.001 to about 2 molar, preferably about 0.1 molar.

The electrolyte is preferably an aqueous system, but an organic solvent which will dissolve both the pyrrole and the soluble non-nucleophilic anion-containing salt or acid as the supporting electrolyte, and is non-reactive therewith, can be employed. Such solvents include alcohols, ethers, e.g. dioxane, acetone, acetonitrile, tetrahydrofuran, and the like. Water can be added to increase the electrical conductivity if a water miscible organic solvent is employed.

If desired, the aqueous electrolytes can also include a wetting agent, e.g. sodium dodecylsulfate, in minor proportion of about 0.2 to about 2 gms per liter.

The cathode of the electrolytic system can be, for example, a stainless steel cathode.

However, other types of electrodes can be employed. Thus, noble metal, e.g. platinum, anodes and cathodes also can be employed.

The electrolysis is generally carried out at ambient or room temperature. However, the temperature can be higher or lower, e.g. up to the boiling point or down to the solidification point of the electrolyte. Although in preferred practice the electrolysis is carried out in the presence of oxygen in the air, if desired, it can be carried out under an inert gas atmosphere.

The electrolysis of the pyrrole monomer in the presence of non-nucleophilic anions, is carried out at a current density which can range from about 100 microamps/cm$^2$ to about 20 milliamps/cm$^2$, e.g 2.4 milliamps/cm$^2$. The time for electrolysis can range, for example from about 0.3 to about 5 hours, depending on the area of the anode.

During electrolysis, the conductive polypyrrole, comprised of a positively charged polypyrrole framework or cation and non-nucleophilic anion counterions precipitates on the anode and within the pores of the porous, e.g. fiberglass fabric, thereby impregnating the porous material with the conductive polypyrrole. After precipitation or deposition of the conducting organic polymer within the pores of the porous material or substrate, the anode containing the polymer impregnated substrate is removed from the electrolysis apparatus and rinsed with water. The polymer impregnated substrate is then dried at ambient temperature or elevated temperature up to about 100° C., and the composite comprised of the polymer impregnated substrate is then carefully peeled from the anode. In preferred practice, a polished anode is employed to facilitate peeling of the composite from the anode.

The resulting composite or polypyrrole impregnated substrate has an electrical conductivity which can range in aqueous systems from about $10^{-3}$ ohm$^{-1}$ cm$^{-1}$ to about 150 ohm$^{-1}$ cm$^{-1}$, generally corresponding to a sheet resistivity ranging from about 1659 ohms/square to about 5 ohms/square. The term "ohms/square" as a measure of sheet resistivity is defined as the bulk resistivity of the sample which is expressed in ohm×cm divided by the thickness in cm. The composite has good mechanical properties and is essentially non-brittle and readily handleable, as contrasted to the free standing films of the conductive polypyrrole of the prior art.

The following are examples of practice of the invention, it being understood that such examples are only illustrative and in no sense limitative of the invention.

EXAMPLE I

A piece of 1080 fiberglass was tightly wrapped around an anode in the form of a polished gold plated copper cylinder 4 inches in length and having an exposed area of about 103 cm$^2$, and the fiberglass was secured flat against the anode.

The anode with the fiberglass fabric secured thereto was placed in the inner anode compartment of a vessel, the outer cathode compartment being separated from the anode compartment by a Teflon beaker having four separators therein comprised of agar in sintered glass to separate the anode and cathode compartments so as to permit passage of ions while preventing combining of the solutions of the inner anode compartment and the outer cathode compartment.

The cathode was in the form of a large stainless steel cylindrical sheet placed concentrically around the anode compartment and around the Teflon beaker into a solution to form a cathode compartment.

The electrolyte in the anode compartment was comprised of a freshly made mixture of 40 grams $H_2SO_4$, 11 grams pyrrole, and 0.25 gram sodium dodecyl sulfate surfactant, diluted to 1500 ml with water.

The cathode compartment contained an aqueous solution of 0.1 molar sulfuric acid.

The cylindrical anode carrying the fiberglass fabric sheet was rotated in the anode compartment at about 200 RPM and the current was turned on. Electrolysis was carried out at a constant current of 250 milliamps until a charge of about 2480 coulombs had passed. The electrolysis was carried out over a period of about $2\frac{3}{4}$ hours at room temperature.

Following electrolytic oxidation and precipitation of the conductive polypyrrole in the pores or interstices of the fiberglass fabric, the anode containing the fiberglass fabric impregnated with the conductive polypyrrole formed of the polypyrrole cation and bisulfate anion was removed from the rotator and from the anode compartment of the electrolytic apparatus, rinsed with water, and the polymer impregnated fiberglass fabric substrate dried for 30 minutes at room temperature. The fiberglass impregnated with polypyrrole doped with bisulfate was then carefully peeled from the anode surface.

The polymer impregnated fiberglass substrate was then placed on a flat surface, the edges of the fiberglass-polymer taped down on such surface and the composite was permitted to dry overnight at room temperature.

The dried composite had a sheet resistivity of 41 ohms/square. The fiberglass-polypyrrole composite had an overall thickness of about 3 mils, was non-brittle, relatively flexible and had good mechanical properties.

EXAMPLE II

The procedure of Example I above was substantially followed but employing as anode compartment electrolyte a solution comprised of 40 grams sulfuric acid, 0.25 gram sodium dodecyl sulfate, 75 ml methanol, 6.08 grams pyrrole, and 4.92 grams of N-methylpyrrole, diluted to 1500 ml with water.

The electrolytic procedure was carried out under the same conditions as in Example I above to form a fiberglass fabric impregnated with a polypyrrole co-polymer comprised of about 60% polypyrrole and 40% poly-(N-methylpyrrole), doped with bisulfate.

The resulting composite had a sheet resistivity of 471 ohms/square.

EXAMPLE III

The procedure of Example I was essentially followed except that the anode compartment electrolyte contained the same amount of pyrrole as the anode electrolyte in Example I, but contained 0.1 molar sodium dodecylsulfate as dopant, and no sulfuric acid.

The resultant fiberglass-polypyrrole composite had a sheet resistivity of 5 ohms/square.

EXAMPLE IV

The procedure of Example I was substantially followed except that the anode electrolyte was comprised of 60 grams polystyrenesulfonic acid and 30 grams pyrrole in 1500 ml water, and the solution adjusted to pH 4.

The resulting fiberglass/polypyrrole doped with polystyrenesulfonate had a sheet resistivity of 14 ohms/square.

The novel composites of the invention having good electrical conductivity and improved mechanical properties and structural integrity, particularly freedom from brittleness, have various uses including the production of electrodes, batteries, switches, semi-conductor components, and in anti-static applications, e.g. anti-static finishes for plastics, electromagnetic interference shielding applications and as electrical conductors.

From the foregoing, it is seen that the invention provides electrically conductive composites formed of a porous electrical insulating material or substrate electrochemically impregnated with a conductive pyrrole polymer having varying degrees of electrical conductivity depending upon the dopant employed, or on the pyrrole/substituted pyrrole ratio in the electrolyte, and having enhanced structural integrity and freedom from brittleness.

Since various changes and modifications of the invention will occur to and can be made readily by those skilled in the art without departing from the invention concept, the invention is not to be taken as limited except by the scope of the appended claims.

What is claimed is:

1. An electrically conductive composite comprising a dielectric porous substance and an electrically conductive pyrrole polymer electrochemically deposited in the pores of said substance, said porous substance supporting said pyrrole polymer, said composite being essentially non-brittle.

2. The composite of claim 1, said porous substance selected from the group consisting of a porous ceramic, porous glass frit, a porous organic foam, and a fabric.

3. The composite of claim 2, said porous substance being a fabric selected from the group consisting of fiberglass fabric, mixed oxide fabric and a synthetic organic woven or non-woven fabric.

4. The composite of claim 3, said dielectric porous substance being fiberglass fabric.

5. The composite of claim 1, said pyrrole polymer selected from the group consisting of polypyrrole, a 3- or 3,4- alkyl or aryl C-substituted pyrrole polymer, N-alkylpyrrole polymer and N-arylpyrrole polymer, and a copolymer of pyrrole and a C- or N-substituted derivative of pyrrole as above defined.

6. The composite of claim 1, said polymer being polypyrrole.

7. The composite of claim 1, said conductive pyrrole polymer comprising a pyrrole polymer cation and a substantially non-nucleophilic anion.

8. The composite of claim 7, said anion being a strong acid anion.

9. The composite of claim 7, said non-nucleophilic anion being selected from the group consisting of sulfate, bisulfate, perchlorate, chloride, fluoborate, $PF_6^-$, $AsF_6^-$, and $SbF_6^-$ anions.

10. The composite of claim 7, said non-nucleophilic anion selected from the group consisting of p-toluenesulfonate, polystyrene sulfonate, polyvinylsulfonate, the corresponding free sulfonic acids, and dodecylsulfate.

11. The composite of claim 1, said dielectric porous substance being fiberglass fabric, and said pyrrole polymer comprising a polypyrrole cation and bisulfate anion.

12. The composite of claim 1, said porous substance having a thickness of about 1 to about 10 mils.

13. The composite of claim 1, said composite having an electrical conductivity ranging from about $10^{-3}$ ohm$^{-1}$ cm$^{-1}$ to about 150 ohm$^{-1}$ cm$^{-1}$.

14. A process for producing an electrically conductive composite which comprises contacting a dielectric porous substance with an anode in an electrolytic cell containing an electrolyte comprising a pyrrole monomer and a substantially non-nucleophilic anion, electrochemically depositing a conductive pyrrole polymer in the pores of said substance, and removing the resulting composite comprised of said porous substance impregnated with said pyrrole polymer from said anode.

15. The process of claim 14, said electrolytic cell comprising an anode compartment and a cathode compartment, said anode immersed in said electrolytic present in the anode compartment.

16. An electrically conductive composite produced by the process of claim 15.

17. The process of claim 15, said pyrrole monomer selected from the group consisting of pyrrole, a 3- or 3,4-alkyl or aryl C-substituted pyrrole, an N-alkylpyrrole and an N-arylpyrrole.

18. An electrically conductive composite produced by the process of claim 17.

19. The process of claim 17, said non-nucleophilic anion being selected from the group consisting of sulfate, bisulfate, perchlorate, chloride, fluoborate, $PF_6^-$, $AsF_6^-$, and $SbF_6^-$ anions.

20. An electrically conductive composite produced by the process of claim 19.

21. The process of claim 19, said non-nucleophilic anion being derived from the free acids or the soluble salts of said acids.

22. The process of claim 15, said non-nucleophilic anion selected from the group consisting of p-toluenesulfonate, polystyrenesulfonate, polyvinylsulfonate, the corresponding free sulfonic acids, and dodecylsulfate.

23. An electrically conductive composite produced by the process of claim 22.

24. The process of claim 15, said dielectric porous substance selected from the group consisting of a porous ceramic, porous glass frit, a porous organic foam, and a woven or non-woven fabric.

25. The process of claim 24, said porous substance being a fabric selected from the group consisting of fiberglass fabric, mixed oxide fabric and a synthetic organic fabric.

26. An electrically conductive composite produced by the process of claim 25.

27. The process of claim 25, said porous substance being fiberglass fabric.

28. An electrically conductive composite produced by the process of claim 24.

29. The process of claim 15, said electrolyte comprising an aqueous solution.

30. The process of claim 15, said electrolyte comprising an organic solvent solution.

31. The process of claim 15, said electrochemical deposition being carried out at a current density of from about 100 microamps/cm$^2$ to about 20 milliamps/cm$^2$, for a period of about 0.3 to about 5 hours.

32. The process of claim 15, said pyrrole monomer being present in a concentration in the range from about 0.01 to about 1 molar, and said non-nucleophilic anion being present in a concentration in the range from about 0.001 to about 2 molar.

33. The process of claim 32, said porous substance being fiberglass fabric, said electrolyte solution comprising an aqueous solution of pyrrole and containing bisulfate anion.

34. An electrically conductive composite produced by the process of claim 33, said composite having a sheet resistivity ranging from about 1659 ohms/square to about 5 ohms/square.

35. The process of claim 14, including the steps of removing the anode containing said porous substance and conductive pyrrole polymer from said electrolytic cell, drying the composite comprised of said porous substance impregnated with pyrrole polymer, and peeling said composite from said anode.

* * * * *

UNITED STATES PATENT AND TRADEMARK OFFICE
CERTIFICATE OF CORRECTION

PATENT NO. : 4,582,575
DATED : April 15, 1986
INVENTOR(S) : Leslie F. Warren, et al.

It is certified that error appears in the above–identified patent and that said Letters Patent are hereby corrected as shown below:

Column 6, line 43, in claim 2, before "fabric" insert --woven or non-woven--.

Column 6, line 47, in claim 3, after "organic" delete "woven or non-woven".

Signed and Sealed this

Twelfth Day of August 1986

[SEAL]

Attest:

DONALD J. QUIGG

Attesting Officer

Commissioner of Patents and Trademarks